United States Patent [19]

Erkfritz

[11] Patent Number: 4,585,375
[45] Date of Patent: Apr. 29, 1986

[54] MILLING INSERTS

[75] Inventor: Donald S. Erkfritz, Clarkston, Mich.

[73] Assignee: General Electric Company, Detroit, Mich.

[21] Appl. No.: 578,919

[22] Filed: Feb. 10, 1984

[51] Int. Cl.$^4$ .................. B23B 27/16; B23B 27/22; B23C 5/20
[52] U.S. Cl. .................. 407/114; 407/113; 408/224; 408/227; 408/713
[58] Field of Search ............... 407/113, 114, 115, 116, 407/117; 408/223, 224, 199, 186, 227, 228, 713

[56] References Cited

U.S. PATENT DOCUMENTS

| | | | |
|---|---|---|---|
| 3,354,526 | 11/1967 | Erkfritz . | |
| 3,681,830 | 8/1972 | Dupuis | 407/113 |
| 3,694,876 | 10/1972 | Erkfritz . | |
| 3,701,187 | 10/1972 | Erkfritz . | |
| 3,708,843 | 1/1973 | Erkfritz . | |
| 3,716,900 | 2/1973 | Erkfritz . | |
| 3,762,005 | 10/1973 | Erkfritz | 407/113 |
| 3,934,319 | 1/1976 | Schuler | 407/113 |
| 3,955,259 | 5/1976 | Gustafsson | 407/113 |
| 4,182,587 | 1/1980 | Striegl | 407/113 |
| 4,411,564 | 10/1983 | Johnson | 407/113 |

FOREIGN PATENT DOCUMENTS

| | | | |
|---|---|---|---|
| 153335 | 1/1982 | Fed. Rep. of Germany | 407/113 |
| 69888 | 6/1979 | Japan | 407/113 |

Primary Examiner—Francis S. Husar
Assistant Examiner—Jerry Kearns
Attorney, Agent, or Firm—A. E. Bahr; E. F. Chapman; J. J. Lichiello

[57] ABSTRACT

A cutter insert is provided which is adapted to be supported on a flat platform on a cutter body and abutting edgewise against walls upstanding from said platform. The insert comprises a flat block of cutting material in the geometric shape of a parallelogram having a hole extending therethrough between the upper surface and the mounting surface of the block to receive a screw for securing the block to the platform. The upper surface of the block terminates at opposite ends in radii. The cutter insert further includes a rake face and a clearance face on opposite sides of the hole with said upper surface and said faces constituting cutting edges defined by the intersections of said faces and said upper surface, and an angular facet at diagonally opposed ends of said radii so as to form a chip splitter at the juncture of the cutting edge of the rake face and the cutting edge of the angular facet.

10 Claims, 4 Drawing Figures

MILLING INSERTS

BACKGROUND OF THE INVENTION

This invention relates generally to cutter inserts and more particularly to cutter blades adapted to be clamped to and located edgewise on a supporting platform by means of a conically headed screw extending through a center aperture in the insert and acting during final tightening of the screw to force the insert to abut against the walls of the platform.

Cutting inserts are well known in the art and have taken many shapes and forms as described in many publications and patents, two of which are U.S. Pat. No. 3,354,526, issued Nov. 28, 1967 and U.S. Pat. No. 3,694,876, issued Oct. 3, 1972 both in the name of the present inventor. These cutter inserts are designed for use with milling tools and the like which rotate about an axis so as to provide the desired cutting operation.

The natural tendency of the chip in the cutting process is to remain intact from the point of contact at the insert cutting point to the depth of cut line on the piece part. When curvatures are involved at the cutting point, the tendency is for the chip to distort itself to the center of convergence of the radius. If the chip remains intact at its full contact length along the rake face of the insert, it necessarily would distort the whole chip to conformity. Accordingly, it is highly desirable to split the chips so that the portion of the chip along the rake face can move up that face without interference and that portion of the chip in the immediate area of the radius can take its natural path to the chip pocket storage area.

Accordingly, it is an object of this invention to provide a cutter insert which includes chip splitting capabilities.

Another object of this invention is to provide a cutter insert composed of a larger and a longer insert in order to obtain greater depth.

Yet another object of this invention is to provide a cutter insert having a geometry which reduces the pressure on the insert and associated securing means and thus prolongs the life of the equipment.

These and other objects of the invention will become obvious from the following description taken in conjunction with the drawings.

SUMMARY OF THE INVENTION

An insert is provided which is adapted to be supported on a flat platform on a cutter body and abutting edgewise against walls upstanding from said platform. The insert comprises a flat block of cutting material in the geometric shape of a parallelogram having a hole extending therethrough between the upper surface and the mounting surface of the block to receive a flat head screw for securing the block to the platform. The cutter insert further includes a substantially parallel rake face and clearance face on opposite sides of the hole terminating at radii with said rake face and said adjacent radii constituting cutting edges defined by the intersections of said rake and said radii at said upper surface and an angular facet at diagonally opposed ends of said radii so as to form a chip splitter at the juncture of the rake face and the angular facet. This configuration provides two indexes on the insert at 180° each with two cutting edges, one on the rake face and one on the angular facet.

DETAILED DESCRIPTION OF A PREFERRED EMBODIMENT

Figure 1:
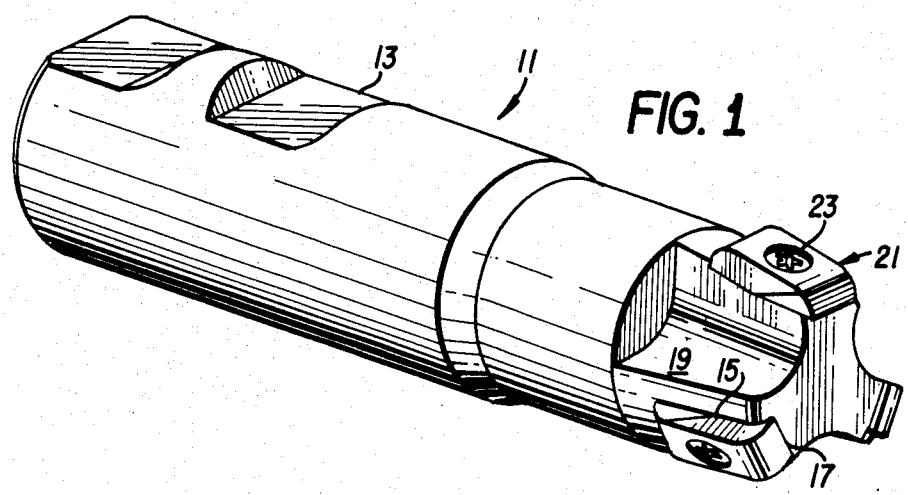
FIG. 1 illustrates the cutter insert of the present invention as used with an end mill.

Referring now to the drawings and particularly to FIG. 1, there is illustrated an end mill 11 comprising a conventional tool holder having a suitable flat or key way 13 for mounting the tool holder on a power driven appliance adapted to rotate the tool holder and the cutter blades carried thereby to mill a workpiece. The particular tool holder as shown in FIG. 1 includes three blade receiving pockets 15 all of which are substantially identical, it being understood that the toolholder may be equipped with one blade receiving pocket or a plurality thereof as the situation warrants. It is to be further understood that the invention is not limited to the use of this particular tool holder.

Each blade receiving pocket 15 includes a substantially planar mounting platform 17 suitably machined or otherwise formed integral with the tool holder, and a pair of angularly related locating walls, machined from or otherwise suitably formed integral with the tool holder, which are upstanding and projecting from the aforementioned platform. Arcuate shaped chip pockets 19 are located adjacent to each of the platforms.

As indicated, the cutter insert 21 of the present invention is located on the platform adjacent to the locating walls. Each insert is secured to the platform by means such as a screw 23.

Figure 2:
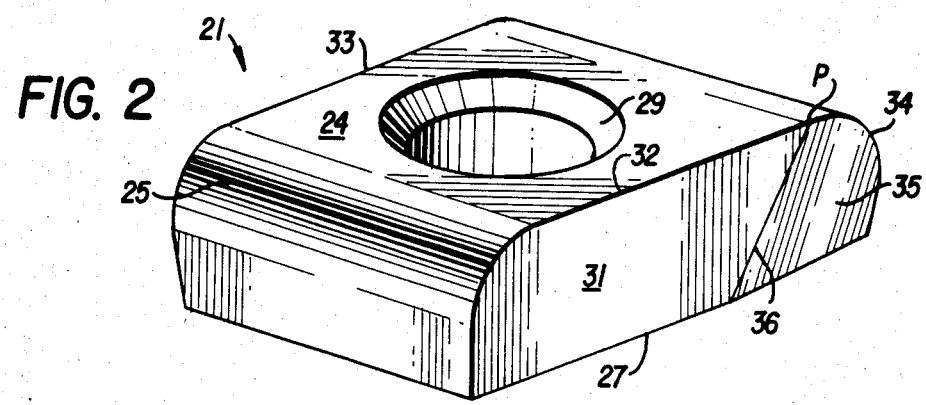
FIG. 2 is a perspective view of the cutter insert of the present invention.

Turning now to FIG. 2, an enlarged view of the cutter insert of the present invention is illustrated. The insert comprises upper surface (clearance edge) 24 and a substantially flat mounting surface 27 with the major portions of said surfaces being substantially parallel. The upper face terminates at opposite ends at radiused surfaces 25. A bore hole 29 extends between the two faces so as to accept screw 23 as shown in FIG. 1. Opposed substantially parallel surfaces 31 and 33 comprise the clearance face and rake face of the insert. It is to be understood that if the insert were indexed the clearance face would become the rake face and vice versa.

Figure 3:
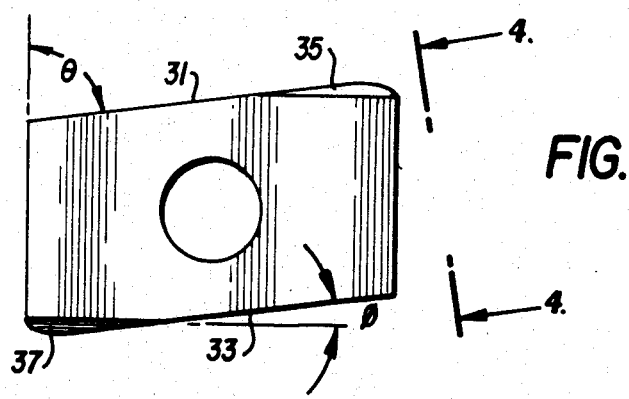
FIG. 3 is a bottom view of the cutter insert of FIG. 2.
Figure 4:
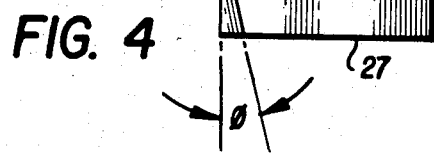
FIG. 4 is an end view of the cutter insert of FIG. 3.

Referring to FIGS. 2, 3 and 4, angular facets 35 and 37 exist at diagonally opposed ends of rake and clearance faces 31 and 33 and extend inwardly of upper surface 24 and mounting surface 27. This permits indexing by rotating the cutter 180°. Angular facets 35 and 37 are formed so as to present a rake of a particularly desired angle $\phi$ as indicated in FIGS. 3 and 4.

The angle $\phi$ may vary depending upon the length of the cutter. However, the juncture line 36 between the rake face and the facet does not extend to the lateral axis of the cutter through the bore hole 29. This is essential in order to prevent the cutter from having any rotational movement about the retaining screw during the milling operation. Accordingly, angle $\phi$ may be between 5° and 12° depending upon the longitudinal dimension of the cutter insert. Preferably, the angle is approximately 8°. This angular facet creates a chip splitting corner P where the cutting edges 32 and 34 of the rake face and facet radius meet. Corner P is at the point of tangency of cutting edge 32 and radius cutting edge 34.

As will be obvious from FIG. 3, the cutter insert has a geometrical shape of a parallelogram. Although the insert may be rectangular, a non-rectangular parallelogram is preferred in order to obtain a higher shearing during the milling operation. The angle φ of the parallelogram may vary, but a preferred angle is 80° which forms a leading cutting edge at the corner of the cutter insert where the angular facet meets the radius.

If a cutter insert is used having substantially the same shape as that shown in FIGS. 2, 3 and 4 without the angular facets as shown, the chip in the cutting process, has a tendency to remain intact from the point of contact at the insert cutting point as described above. If the chip remains intact, it can cause severe distortion and improper milling. Because of the angular facet as disclosed above, the milling operation effectively changes the center of convergence of the deformed chip to an advantage by moving that point rearward to the point P where the facet meets the rake face at the radiused surface so as to provide a chip splitter at corner P. The resulting chip splitting capabilities tend to relieve the pressure surrounding the cutting edge so that portion of the chip along the rake face can move up the face without interference and that portion of the chip in the immediate area of the radius can take its natural path in the storage area of the angle along the faceted face.

This provides positive axial at the rake face which directs that portion of the chip away from the cutting corner and negative axial at the angular facet which directs the chip toward the cutting corner.

Tests have proven that this system using the cutting insert of the present invention works well with tough materials such as Inconel, titanium and stainless steel.

It is well known that previous inserts tend to put loading on the screw head, which is in tension, during the milling operation. In contrast, the cutter insert of the present invention places the cutting forces near the bottom line of the insert pocket at the insert walls so as to relieve the stress on the screw head.

As will be obvious, the particular body structure of the insert may be modified to fit any type of cutter which may be used while still retaining the advantages obtained by the particular rake face and angular facet associated therewith. Accordingly, the above description and drawings are illustrative only and the invention is to be limited only by the scope of the following claims.

I claim:

1. A cutter insert adapted to be supported on a flat platform on a cutter body and abutting edgewise against walls upstanding from a corner of said platform, said insert comprising
   a substantially flat block of cutting material having an upper surface and a lower mounting surface, the block having the geometrical shape of a parallelogram with a center hole extending therethrough between the upper surface and the mounting surface of said block to receive a screw for securing said block to said platform, said upper surface terminating at opposite ends in equal radii;
   a rake face and a clearance face on opposite sides of said surfaces, said surfaces and said faces constituting cutting edges defined by the intersections of said faces and said upper surfaces;
   an angular facet having a radius cutting edge on the rake face forming a juncture line at the intersection of the rake face and the angular facet at diagonally opposed corners of said radii and extending inwardly of said upper surface and said mounting surface so as to form a chip splitter at the juncture of the cutting edge of said rake face and the radius cutting edge of said angular facet, the juncture being at the point of tangency of the cutting edge of said rake face and the cutting edge of said angular facet; and
   a leading cutting edge at the corner where the juncture line of the rake face and the angular facet meets the radius.

2. The insert of claim 1 wherein said angular facet forms an angle with respect to said rake face of between 5° and 12°.

3. The insert of claim 1 wherein said angular facet forms an angle with respect to said rake face of substantially 8°.

4. The insert of claim 1 wherein the juncture of said rake face and said angular facet is forward of the transverse axis of said insert passing through said center hole.

5. The insert of claim 1 wherein the cutting edge of said rake face is tangential to said radii.

6. A cutter insert adapted to be supported on a flat platform on a cutter body and abutting edgewise against walls upstanding from a corner of said platform, said insert comprising
   a substantially flat block of cutting material having an upper surface and a lower mounting surface, the block having the geometrical shape of a parallelogram with a center hole extending therethrough between the upper surface and the mounting surface of said block to receive a screw for securing said block to said platform, said upper surface terminating at opposite ends in equal radii;
   at least one substantially flat rake face extending between said upper surface and mounting surface, said surfaces and said rake face constituting a cutting edge defined by the intersection of said rake face and said upper surface;
   an angular facet having a radius cutting edge at one end of said rake face forming a juncture line at the intersection of the rake face and the angular facet extending inwardly of said upper surface and said mounting surface so as to form a chip splitter at the juncture of the cutting edge of said rake face and the radius cutting edge of said angular facet, the juncture being at the point of tangency of the cutting edge of said rake face and the radius cutting edge of said angular facet; and
   a leading cutting edge at the corner where the juncture line of the rake face and the angular facet meets the radius.

7. The insert of claim 6 wherein said angular facet forms an angle with respect to said rake face of between 5° and 12°.

8. The insert of claim 6 wherein said angular facet forms an angle with respect to said rake face of substantially 8°.

9. The insert of claim 6 wherein the juncture of said rake face and said angular facet is forward of the transverse axis of said insert passing through said center hole.

10. The insert of claim 6 wherein the cutting edge of said rake face is tangential the adjacent radius.

* * * * *